United States Patent [19]
Gerace et al.

[11] Patent Number: 5,922,834
[45] Date of Patent: Jul. 13, 1999

[54] METHOD FOR TREATING PAINT SLUDGE

[75] Inventors: Michael Joseph Gerace, Dayton; Sevilla C. Gamboa, Huber Heights; Yasminka S. Landaburu, Yellow Springs, all of Ohio

[73] Assignee: Aster, Inc., Fairborn, Ohio

[21] Appl. No.: 08/892,486

[22] Filed: Jul. 14, 1997

Related U.S. Application Data

[63] Continuation-in-part of application No. 08/558,008, Nov. 13, 1995.

[51] Int. Cl.$^6$ .................................. C08F 6/14; C08F 6/24
[52] U.S. Cl. ..................... 528/492; 528/487; 528/488; 528/489; 528/490; 528/503; 524/13; 524/16; 524/423; 524/424; 524/425; 524/433; 524/437; 524/445; 524/567; 524/569; 210/757; 210/766; 34/381; 34/389
[58] Field of Search ............................ 528/485, 487, 528/488, 489, 490, 492, 503; 34/9, 12, 15, 381, 389; 134/38; 210/757, 766; 524/13, 16, 423, 424, 425, 433, 437, 445, 567, 569

[56] References Cited

U.S. PATENT DOCUMENTS 3,723,148  3/1973  Tupper ................................ 210/930 X
4,980,030 12/1990  Johnson et al. .
5,087,375  2/1992  Weinwurm .
5,092,928  3/1992  Spangler .
5,160,628 11/1992  Gerace et al. .
5,223,106  6/1993  Gerace et al. .
5,254,263 10/1993  Gerace et al. .
5,376,238 12/1994  Zambory .
5,453,460  9/1995  Hovestadt et al. .

FOREIGN PATENT DOCUMENTS 212214    3/1987  European Pat. Off. .
613922 A1 9/1994  European Pat. Off. .
3150718   6/1983  Germany .
2135328   8/1984  United Kingdom .

*Primary Examiner*—Fred Teskin
*Attorney, Agent, or Firm*—Killworth, Gottman, Hagan & Schaeff, L.L.P.

[57] ABSTRACT

A method of treating paint sludge containing uncured polymer resin, water and/or solvent is provided in which a paint sludge putty is formed which may be used as a replacement for polymeric components used to form compounded polymeric compositions. The treated paint sludge putty or powder comprises from about 5 to 90% by weight of the total compounded polymeric composition and may be used in a variety of compositions including pressure sensitive sealants, caulking sealants, automotive sealants, polyvinyl chloride plastics, rubbers and asphalt cement coatings, and waterbased sealers and coatings.

14 Claims, No Drawings

METHOD FOR TREATING PAINT SLUDGE

CROSS-REFERENCE TO RELATED APPLICATIONS

This application is a continuation-in-part of U.S. application Ser. No. 08/558,008 filed Nov. 13, 1995.

BACKGROUND OF THE INVENTION

This invention relates to a method for treating paint sludge, and more particularly, it relates to a method of treating paint sludge which may then be used as a polymeric component in various compounded polymeric compositions such as sealants, adhesives, plastics, rubbers and coatings.

The paint and coatings industry is a major source of chemical wastes. Paint wastes or sludges are produced in the appliance industry, metal fabricating industry, and the automobile industry. For example, it is estimated that nearly 40% of the 6 gallons of paint used to produce the exterior finish on an automobile ends up as waste. Paint sludges are also produced during the painting of wood products, outdoor structures such as bridges and lamp posts, and all types of industrial equipment. Unused or left-over paint requiring disposal is also a "paint sludge" to be dealt with.

Paint sludge typically contains uncured polymer resins, pigments, curing agents, surfactants, and other minor formulation ingredients. In addition, paint sludge typically contains water and/or a variety of organic solvents.

The cost and the environmental impact of disposing of paint sludge has been a source of concern in the industry.

However, in recent years, several processes have been developed for converting paint sludge into useful products, thereby reducing a major source of chemical waste.

One such process is disclosed in U.S. Pat. No. 4,980,030, which includes removing a portion of the water and liquid hydrocarbons from the sludge. The high solids sludge is then heated to remove the remaining water and hydrocarbons. The heating step is also designed to cure the uncured polymeric paint resins. The process is advantageous because it reduces the volume of waste produced, and produces a powder which is somewhat easier to handle than the wet sludge.

A similar process is disclosed in U.S. Pat. No. 5,087,375, which discloses a method of heating and calcining paint sludge to form a product which may be used as a filler for sealants.

However, both U.S. Pat. Nos. 4,980,030 and 5,087,375, completely cure any uncured polymers in the paint sludge during their heating and/or calcining steps. Accordingly, the resulting product is an inert, inorganic, brittle, abrasive particulate material.

An improved process is disclosed in U.S. Pat. Nos. 5,160,628, and 5,254,263, assigned to the same assignee as the present invention, which disclose a product formed from paint sludge containing water, solvent and uncured polymer resin which may be used as a filler in sealant compositions. By keeping the polymer uncured, the resulting product is soft and easily dispersible. However, this process requires that the heating temperature must not exceed 100° F. so that the polymer remains uncured.

Further, fillers are only one of several components of sealants and other related compositions, which are generally comprised of other components such as polymers and plasticizers. Such components typically comprise up to 75% or more of the total compounded polymeric composition, and polymers in particular usually account for a significant portion of the cost of sealant formulations. It would be desirable to be able use paint sludge as a replacement for one of the polymeric components in sealants and other related compositions to reduce production costs.

Accordingly, the need remains for a method of treating paint sludge containing uncured polymer resins, water and/or solvent to form sealant compositions and related products which utilize paint sludge as a polymeric component thereof, which are cost effective to produce, and which do not require complex processing steps.

SUMMARY OF THE INVENTION

The present invention solves those needs by providing a method of treating paint sludge which results in a putty or powder which may be used to form compounded polymeric compositions such as sealants, adhesives, rubbers, and other related compositions. The treated paint sludge may be a paint sludge from the automotive industry, appliance industry, metal fabricating industry or other sources. The treated paint sludge contains uncured polymer which may be used in a variety of compositions as a low cost replacement for more costly polymeric components such as resins, plasticizers, binders, curing agents, tackifiers, and modifiers.

According to one aspect of the present invention, the, a method of treating paint sludge which contains water, solvent and uncured polymer resin is provided which comprises the steps of removing a substantial portion of the water and solvent from the paint sludge by drying the sludge without curing the polymer in the sludge. This is preferably achieved by agitating the raw sludge under a vacuum at a temperature of about 225° F. such that a substantial portion of the water and solvent are removed from the sludge. The sludge is preferably decatalyzed by treatment with a decatalyzing agent comprising a base having a pH range from 8 to 13. By "decatalyzed", it is meant that the catalyst normally present in the paint sludge is neutralized such that the curing component in the paint sludge is not activated upon heating. Preferably, the paint sludge is treated with a base which is selected from the group consisting of diethanolamine, 2-amino-2-methyl-2-propanol, diisopropanol amine, triisopropanol amine, potassium hydroxide, and sodium hydroxide. The base preferably comprises from about 0.1 to 10% by weight of the total raw sludge composition.

With traditional solvent based paint sludges (containing polyester, acrylic and melamine resins), the above-described paint sludge treatment process yields a putty as described in parent application Ser. No. 08/558,008. It has now been found that these putties can be converted into a powder by the addition of 5 to 75 percent by weight processing fillers during the treatment process. Fillers which may be used include those disclosed in U.S. Pat. No. 5,254,263, which is hereby incorporated by reference. Included are calcium oxide, calcium sulfate, calcium chloride, magnesium sulfate, sodium sulfate, potassium carbonate, calcium carbonate, silica, talc, hydrated aluminum, wood flour, shells, poly soy and cork. The preferred processing fillers are carbon black, clay and mixtures thereof. Accordingly, by decatalyzing the paint sludge as described above, then adding the processing fillers, then removing the volatiles as described above, a powder containing uncured polymer is achieved.

In several other embodiments of the invention, a method is provided for treating paint sludge in which the paint sludge contains solvent and uncured polymer. The paint sludge may contain organic solvent but no water or water and no other solvent. In these embodiments, a substantial portion of the water or solvent is removed from the paint sludge by drying the sludge without curing the polymer in the sludge. This is achieved by agitating the raw sludge under a vacuum at a temperature of about 230° F. such that a substantial portion of the water or solvent is removed from the sludge. The sludge is also decatalyzed by treatment with a decatalyzing agent comprising a base having a pH range from 8 to 13. As described above, the paint sludge is preferably decatalyzed by treatment with a base selected from the group consisting of diethanolamine, 2-amino-2-methyl-2-propanol, diiospropanol amine, triisopropanol amine, potassium hydroxide, and sodium hydroxide. The base preferably comprises from about 0.1 to 10% by weight of the total raw sludge composition.

It has been discovered that with certain paint sludges, such as urethane or epoxy based ones, or waterbased sludges, a powder results by direct processing with the addition of processing fillers. Addition of the optional processing fillers as discussed above does not change that result. Accordingly, a universally applicable, powder-producing process is one involving the steps of 1) decatalyzing, 2) adding processing fillers and 3) drying.

After treatment by one of these methods, the treated paint sludge may be used to form a compounded polymeric composition. By "compounded polymeric composition", we mean compositions such as paints, sealants, adhesives, plastics and rubbers which are comprised of at least one polymeric component selected from the group consisting of plasticizers, binders, tackifiers, modifiers, rubbers, resins, and mixtures thereof. The treated paint sludge containing uncured polymer which results from the method of the present invention is used as a replacement for at least a portion of the polymeric components in the composition. The treated paint sludge preferably comprises from about 5 to 90% by weight of the total compounded polymeric composition, and more preferably, from about 20 to 50% by weight.

The treated paint sludge may be used to form compounded polymeric compositions such as heat-curable sealants, pressure sensitive sealants, caulking sealants, automotive paintable seam sealers, automotive underbody sealers, paints, coatings, automotive body shop adhesives, flexible polyvinyl chloride plastics, cured butyl rubbers, and modified asphalt cement coatings.

Because the treated paint sludge formed from the method of the present invention may be used as an inexpensive replacement for more expensive polymeric components, a variety of compounded polymeric compositions may be produced at low cost.

Accordingly, it is an object of the present invention to provide a method of treating paint sludge containing uncured polymer resins, water, and/or solvent to form a treated paint sludge which may be used to form compounded polymeric compositions such as sealants, adhesives, plastics, rubbers and coatings in which the paint sludge is used as a replacement for polymeric components. This, and other objects and advantages of the present invention will become apparent to those skilled in the art from a reading of the following detailed description of the preferred embodiments and the appended claims.

DETAILED DESCRIPTION OF THE PREFERRED EMBODIMENTS

Raw paint sludge collected from many types of operations including the automobile industry, the appliance industry, the metal fabricating industry, etc. may be used in the present invention. For example, the paint sludge may be derived from a high solids enamel paint containing acrylic and polyester paint resins, or it may be derived from a low solids polyester enamel. The paint sludge may contain uncured polymer resins, water and solvent, or it may contain a mixture of uncured polymer resins and water or solvent. Examples of paint sludges which contain a mixture of uncured polymer resins and solvent are purged solvent and still bottoms. Purged solvent sludges generally comprise a paint and solvent mixture, and is produced in processes such as automobile vehicle painting where paint nozzles are routinely flushed with solvents in order to allow the introduction of a different colored paint. Still bottoms sludges result from the process of recycling purged solvents, in which the paint/solvent mixture is partially evaporated to recover solvent. However, such evaporation occurs only to a certain degree such that a concentrated paint/solvent mixture results which, until now, has been difficult to process further. However, with the method of the present invention, such mixtures can be formed into useful products.

For purposes of the present invention, paint sludge having a volatiles content of approximately 10–80% by weight is preferred for use. The treated paint sludge may be produced by any method which is capable of removing water and/or solvent from raw paint sludge without curing the polymers in the paint sludge. In embodiments where the paint sludge contains water, solvent, and uncured polymer resin, the preferred process is to remove a substantial portion of water from a 50% solids mixture of paint sludge, water, and solvent by agitation under low shear conditions. The sludge is then heated under vacuum at about 225° F. until the sludge has a solids content of greater than about 95% solids. It should be noted that in the time it takes for the water to be removed (about half an hour), the paint sludge will not cure. However, exposure to temperatures of up to 250° F. for over 24 hours will cause the curing system in the paint sludge to activate. Accordingly, where the treated paint sludge is to be used in applications where heat sensitivity is desired, such as in heat or chemical curable sealant compositions where the treated paint sludge can also function as a curing agent, the decatalyzation process is not required. However, if the treated paint is to be used in compositions such as pressure sensitive sealants, caulking sealants, and related products, the paint sludge is preferably treated by decatalyzation so that a non-curing sludge is formed. If the water/solvent removal step can be performed without substantial curing of the paint sludge, the decatalyzation process may be performed thereafter. It is also possible, and often desirable to add the decatalyzing agent prior to any heat treatment step, including the water/solvent removal step.

It has been found that by adding a base to the treated sludge, a decatalyzed or non-curing sludge results. The base functions to neutralize the sulfonic acid catalyst present in the paint sludge, which, under normal conditions, would activate the melamine cure system normally present in the paint upon exposure to heat. A number of organic and inorganic bases are suitable for use in the present invention including diethanolamine, 2-amino-2-methyl-2 propanol, diisopropanol amine, triisopropanol amine, potassium hydroxide and sodium hydroxide. A preferred inorganic base is potassium hydroxide. The base is preferably added in an amount from 0.1 to 10% of the total raw sludge composition, and more preferably, about 1%.

In embodiments where the paint sludge contains uncured polymer resin and solvent, the preferred process is to remove a substantial portion of solvent from a 50% solids mixture of paint sludge containing solvent by agitating the sludge under vacuum at about 230° F. until the sludge has a solids content of at least 95% by weight.

After water and/or solvent removal and decatalyzation, the treated paint sludge may be used in its resultant form, either as a putty or a powder, to produce polymeric compositions. Prior to mixing with other components for forming the desired compounded polymeric composition, the sludge is warmed by mild heating so that it softens.

If a powder is desired, as mentioned above, it is possible to use the optional step of adding a processing filler to assure that a powder containing uncured polymer is produced. That step preferably takes place after decatalyzation and before devolatization. The amount of processing filler added is preferably 5 to 75% by weight of the total raw sludge composition. The preferred processing fillers are clays such as Barden clay available from J. M. Huber Corp. and carbon black such as N550 available from Sid Richardson Carbon Co.

One example of a compounded polymeric composition which utilizes the treated paint sludge of the present invention is a heat-curable sealant composition. The heat-curable sealant composition preferably comprises about 10 to 90% by weight of the treated paint sludge, from about 1 to 10% by weight of a polyvinyl chloride resin, from about 10 to 20% by weight of a polymeric plasticizer, and from about 0.1 to 1% by weight of an adhesion promoter. In this composition, the treated paint sludge functions as a polymeric plasticizer, as an elastomeric modifier, and as a curing agent. In addition, the use of paint sludge also eliminates the need for additional fillers or extenders in the composition.

Suitable polyvinyl chloride resins for use in the heat-curable sealant composition include homopolymers of vinyl chloride as well as copolymers of vinyl chloride with copolymerizable vinyl addition monomers. Blends of several different polyvinyl chloride resins may also be used. Preferred polyvinyl chloride resins for use in the heat-curable sealant composition are Vestolit 7031, a homopolymer dispersion resin, Vestolit B 7070, a copolymer dispersion resin, and Vestolit 7091, a copolymer dispersion resin, all available from A. Schulman, Inc. Another suitable resin is P1361, a homopolymer dispersion resin available from Huels Corp.

Suitable plasticizers for use in the heat-curable sealant composition include diisodecyl phthalate, available from Chem Central under the designation DIDP, aromatic hydrocarbons available from Akrochem Corp. under the designation Plasticizer LN, alkyl phthalates, available from Exxon Chemical under the designations Santicizer 160 or L9P, and a texanol ester, available from Huls America under the designation Nuoplaz Z 1046.

The adhesion promoter used in the heat-curable sealant formulation may include organosilanes, acrylic monomers, epoxy resins, organic peroxides, and isocyanates. Preferred adhesion promoters are Euretek 554, a polyaminamide available from Shell Chemical, Desmodur BL3175A, a blocked aliphatic polyisocyanate resin available from Miles Inc., cumene hydroperoxide, available from Atochem North, Silane A-189, an organosilane ester available from OSI Specialties, Inc., and Ageflex TMPTA, an acrylic monomer available from CPS Chemical.

The heat-curable sealant composition described above is a vinyl plastisol-based composition useful as an automobile sealant. Vinyl plastisols are excellent as sealants over all areas of the automobile body assembly line as they flow readily at room temperature to fill seams and body joints. In addition, they adhere well to oily steel and primed metal surfaces, and can be painted over without leaching or causing other cosmetic problems.

A compounded polymeric composition which utilizes the treated paint sludge of the present invention is a pressure sensitive sealant. In the pressure sensitive sealant composition, the treated paint sludge functions as a plasticizer as well as a polymeric binder. This composition preferably includes from about 5 to 75% by weight of the treated paint sludge, from about 10–20% by weight of a tackifier, 5–15% by weight of a rubber elastomer, and 1–10% by weight of a thixotrope.

The rubber elastomer may comprise butyl rubbers, styrene-butadiene block copolymers, EPDM rubbers, or acrylic polymers. Preferred for use as the rubber elastomer is a butyl rubber, available from Exxon Chemical under the designation Butyl 065. Suitable tackifiers include polybutene, available from Amoco under the designation H-1500.

Suitable thixotropes include carbon black, available from AKZO Chemical under the designation Ketjenblack EC 300, precipitated calcium carbonate, available from H. M. Royal Inc. under the designation Hakuenka CC, fumed silica, available from Cabot Corp. under the designations Cab-o-sil M-5 and Cab-o-sil TS-720.

The resulting pressure sensitive sealants may be used extensively in industrial bonding applications because of their ease of application and convenience of use. The composition may be supplied in the form a butyl tape which may be used to seal automobile windshields, back lites, and quarter windows to car bodies. In addition, the composition may be used in curtainwall construction for buildings, to seal overlap joints in metal buildings, and for telephone cable sealing applications.

In another embodiment of the invention, the compounded polymeric composition may be a caulking sealant comprising from about 15 to 75% of the treated paint sludge, from about 5 to 10% chlorobutyl rubber, from about 20 to 35% by weight of a solvent, and from about 5 to 15% by weight of an ester resin. In this composition, the treated paint sludge functions as a polymeric binder and a tackifier.

A preferred chlorobutyl rubber is available from Exxon Chemical under the designation 1066. A preferred ester resin is available from Hercules under the designation Stabellite #10. Suitable solvents for use in the composition include xylene, butyl alcohol, methyl alcohol, light naphtha, toluene, and isobutyl alcohol.

The caulking sealant composition is similar in composition to the pressure sensitive sealant except that the sealant is reduced to a low viscosity by the addition of a solvent. Because such sealants are of relatively low viscosity, they are easily applied to a joint or on a surface, and after the solvent evaporates, a solid resilient mass remains.

In another embodiment of the invention, the compounded polymeric composition comprises an automotive paintable seam sealer including from 10 to 75% by weight treated paint sludge, from about 15 to 30% by weight of a plasticizer, from about 20 to 25% by weight of a polyvinyl chloride resin, and from about 1 to 5% by weight of an adhesion promoter. A preferred plasticizer for use in this composition is diisononylphthalate, available from Exxon. Preferred polyvinyl chloride resins include Vestolit 7031, available from A. Schulman, Inc. (homopolymer) and Oxy 52, available from Occidental Chemical (copolymer). A preferred adhesion promoter is Euretek 554, available from Shell.

In another embodiment of the invention, the compounded polymeric composition comprises an automotive underbody sealer comprising from about 10 to 75% by weight treated paint sludge, from about 15 to 25% by weight of a thixotrope, from about 20 to 30% by weight of a plasticizer, from about 20 to 30% by weight of a polyvinyl chloride resin, and from about 0.1 to 1.0% of an adhesion promoter. Preferably, the thixotrope comprises ground calcium carbonate, available from H. M. Royal under the designation Camel-cal, and precipitated calcium carbonate, available from H. M. Royal under the designation Hakuenka CC. A preferred plasticizer is diisodecylphthalate available from Chem Central. The preferred polyvinyl chloride resin is Vestolit 7031.

In another embodiment of the invention, the compounded polymeric composition may be an automotive body shop adhesive comprising from 5 to 50% by weight of the treated paint sludge, from about 1 to 5% by weight nitrile rubber, from about 15 to 20% by weight of a thixotrope, from about 20 to 30% by weight of a plasticizer, from about 15 to 30% by weight of a polyvinyl chloride resin, and from about 1 to 5% by weight of a curing agent. A preferred nitrile rubber is available from Enichem under the designation Europrene 2860. A preferred thixotrope is precipitated calcium carbonate, available from H. M. Royal under the designation Hakuenka CC.

In yet another embodiment of the invention, the compounded polymeric composition comprises a flexible polyvinyl chloride plastic comprising from about 5 to 75% by weight treated paint sludge, from about 15 to 30% by weight of a plasticizer, from about 10 to 35% by weight of a thixotrope, and from about 20 to 40% by weight polyvinyl chloride resin. The thixotrope preferably comprises calcium carbonate, available from H. M. Royal under the designation Camel-cal.

In yet another embodiment of the invention, the compounded polymeric composition may be a cured butyl rubber comprising from about 5 to 30% by weight treated paint sludge, from about 15 to 30% by weight butyl rubber, from about 15 to 30% by weight chlorobutyl rubber, from about 25 to 35% by weight of a thixotrope, and from about 5 to 5% by weight paraffinic process oil. Butyl rubber and chlorobutyl rubber are available from Exxon Chemical under the designations Butyl 268 and Chlorbutyl 1068. A preferred thixotrope is carbon black, available from Sid Richardson Carbon under the designations N550 and N774. A preferred processing oil is available from R. E. Carroll under the designation Sunpar 115.

A modified asphalt cement coating may also be formed from the treated paint sludge of the present invention. The coating comprises from about 2 to 50% by weight paint sludge and from about 60 to 95% by weight asphalt cement. The preferred asphalt cement is available from Republic Asphalt under the designation AC-20.

A waterbased paint or sealer may be formulated by first forming the treated paint sludge; emulsifying it and then compounding the emulsified treated paint sludge into a paint. Such a coating contains 27.8% by weight of treated paint sludge, 4.5% by weight of a surfactants, 46.5% by weight of a latex polymer and 15.1% water. The preferred surfactant are Tergitol XD, available from Union Carbide Chemical, T-DET N 20 available from Harcros Chemical and Aromatic 100 available from Chem Central and the preferred polymer latex is Airflex 526 BP Emulsion from Air Products.

In order that the invention may be more readily understood, reference is made to the following examples which are intended to illustrate the invention, but not limit the scope thereof. It should be appreciated that while the compositions described in the Examples are prepared from a treated paint sludge which initially contained water and solvent, such compositions may also be prepared from a paint sludge containing a paint and solvent mixture which has been treated to form a putty as described above and as set forth in Example 12.

EXAMPLE 1

A paint sludge putty was prepared in accordance with the present invention by adding 2,000 grams of raw paint sludge containing water and solvent (50% solids content) in a two-gallon double planetary mixer. The sludge was agitated under low speed for 5 minutes. The resulting sludge was heated to approximately 225° F. by means of the steam in the mixer jacket. In addition, a vacuum of 25 In.Hg. was applied and maintained over the sludge as a means of removing the remaining water from the sludge.

EXAMPLE 2

The paint sludge putty prepared in Example 1 was decatalyzed by adding 80 grams of diethanol amine dissolved with mild heating in 36 grams of diisodecyl phthalate. After five minutes of mixing, heating was discontinued and the batch was discharged.

The melt index of the resulting putty was measured before and after heat aging for 24 hours at 250° F. There was no change in the measured melt index.

EXAMPLE 3

A pressure sensitive sealant composition was prepared using the paint sludge putty of Example 2 by adding 100 grams of butyl rubber (Butyl 065, available from Exxon Chemical), 73 grams of carbon black (Statex MRG, available from Columbian), and 55 grams of a polybutene tackifier (H-1500 available from Amoco) to a one-gallon laboratory Baker Perkins sigma blade mixer. These ingredients were mixed for about 30 minutes until they formed a continuous mass. 455 grams of paint sludge putty was then added and mixed for about 5 minutes, followed by successive additions of 188 g. atapulgite clay (Minugel PC available from Floridin Co.), 18 g. fumed silica (Cab-o-sil M-5 available from Cabot) 91 g. talc (Mistron Vapor available from Cypress), and 100 g. polybutene. The resulting compound was extruded into a ⅜" square configuration tape. The tape showed excellent adhesion to glass and exhibited a cone penetration of 5 mm (100 g. weight at 78° F.), and a compression deflection of 45 psi.

EXAMPLE 4

A caulking sealant composition was prepared using the paint sludge putty formed in Example 2 by adding 570 grams of the paint sludge putty, 75 g. chlorobutyl rubber (1066 available from Exxon), 10 g. fumed silica, and 110 g. Stabellite ester resin (Stabellite #10 available from Hercules) to a one-gallon Baker Perkins sigma blade mixer. The ingredients were mixed for 15 minutes, then successive additions of 9.5 g. xylene, 25 g. butyl alcohol, 55 g. methyl alcohol, 45 g. light naphtha, 10 g. toluene, and 15 g. isobutyl alcohol were added to the mixture with 5 minutes of mixing in between additions.

The resulting sealant was deaired under a vacuum of 25 In.Hg, which yielded an air-free sealant having excellent adhesion to glass, aluminum, concrete and galvanized steel after heat aging at 175° F. for 24 hours. The sealant exhibited a viscosity of 880,000 cps.

EXAMPLE 5

A heat curable sealant composition was prepared using the paint sludge putty of Example 1 of the present invention in which 510 g. of the processed paint sludge putty and 18 g. polyvinyl chloride were mixed for 5 minutes in a one-gallon Baker Perkins sigma blade mixer. This was followed by the addition of 120 g. of diisodecyl phthalate with 10 minutes of mixing.

The following components were then successively added to the composition: 31 g. of an acrylic monomer (Ageflex TMPTA, available from CPS Chemical), 5 g. of organosilane (Silane A-189 available from OSI Specialties, Inc.), 4 g. of cumene hydroperoxide (available from Atochem North), 36 g. of epoxy resin (Epon R 828 available from Shell Chemical), 15 g. of dicyandiamide, and 2 g. of tetrahydrophthalic anhydride.

After curing at 325° F. for 20 minutes, the resulting adhesive showed excellent adhesion to hot dip galvanized steel, cold rolled steel, and PPG ED-11 electrocoated steel. The sealant had a viscosity of 1,460,000 cps.

EXAMPLE 6

An automotive paintable seam sealer composition was prepared using the paint sludge putty of Example 2 which was warmed at 200° F. for 10 minutes. 250 grams of the paint sludge putty and 50 grams of diisononylphthalate were added to a Kitchen-aid mixer and mixed for 4 minutes at medium speed.

Successive additions of 85.5 grams of a homopolymer PVC resin (Vestolit 7031, available from Huels Corp.), 28 grams of a copolymer PVC resin (Oxy 521, available from Oxy Chem), 9 grams of a water scavenger (Calcium Oxide, available from Mississippi Lime Company), 4.5 grams carbon black (Ketjen Black EC-300J, available from Akzo), 9 grams of an adhesion promoter (Euretek 554, available from Shell) and 64 grams of diisononylphthalate were added to the mixture and mixed for 2 minutes at medium speed after each addition.

After curing for 20 minutes at 325° F., the sealer showed excellent adhesion to E-coated metal substrates, elongation between 180%–200% tensile strength between 400 PSI–500 PSI, shear strength of 400 PSI to 500 PSI with 100% cohesive failure and satisfactory paintability with high solids enamel automotive paint.

EXAMPLE 7

An automotive underbody sealer was prepared using the paint sludge putty prepared in Example 2 which was warmed at 200° F. for 10 minutes. 121 grams of the paint sludge putty was then added to 79 grams of ground calcium carbonate (Camel-cal available from H. M. Royal), 26.5 grams of precipitated calcium carbonate (Hakuenka CC, available from H. M. Royal), and 100 grams of diisodecylphthalate, and then mixed for 8 minutes at high speed.

Successive additions of 131.5 grams of PVC homopolymer dispersion resin (Vestolit 7031, available from Huels Corp.), 8 grams of calcium oxide, 26.5 grams diisodecylphthalate, 2.5 grams of an adhesion promoter (Euretek 554, available from Shell) and 5 grams of mineral spirits were added to the initial mixture and mixed for 8 minutes at medium speed. After a 30 minute bake at 275° F., the sealer showed excellent adhesion to an E-coated substrate, 90% elongation, tensile strength of 300 PSI and shear adhesion of 250 PSI with 100% cohesive failure.

EXAMPLE 8

An automotive body shop adhesive composition was prepared using the paint sludge putty prepared in Example 2. A mixture of 600 grams nitrile rubber (Europrene 2860, available from Enichem) and 700 grams of diisodecylphthalate were mixed in an AMK sigma blade mixer and heated until a rubber mass was formed. 2350 grams of paint sludge putty was then added and mixed with the other ingredients for about 30 minutes until a continuous mass was formed.

In a Kitchen-Aid mixer, 73 grams of the above compound was stirred while successively adding 95 grams of precipitated calcium carbonate (Hakuenka CC, available from H. M. Royal), 31.5 grams of clay (HC100 available from Huber), 61 grams doiisodecylphthalate and 25.5 grams of a blowing system prepared by mixing 9 grams of azocarbonamide (Ficel ACS P4, available from Schering Berlin Polymers), 9 grams of zinc oxide (Kadox 911, available from Zinc Corporation of America) and 7.5 grams of diisodecylphthalate. These components were mixed at high speed for 5 minutes.

After the blowing system was added, the compound was mixed for 10 minutes at medium speed followed by the addition of 120 grams of a PVC homopolymer dispersion resin (Vestolit 1361K available from Huels), and 54.5 grams of diisodecylphthalate. These ingredients were mixed for another 10 minutes at medium speed. The following components were then successively added to the composition: 10 grams of an acrylic monomer (Ageflex TMPTA, available from CPS Chemical), 2.5 grams of an organosilane (M8550, available from Huls), 1.0 grams of cumene hydroperoxide (available from Atochem North), 17.5 grams of an epoxy resin (Epon R 828 available from Shell Chemical), 7.5 grams of dicyandiamide and 1.0 grams of tetrahydrophthalic anhydride and mixed at medium speed for 5 minutes.

After curing for 20 minutes at 325° F. the resulting expandable vinyl adhesive had a vertical rise of 60%, compression deflection of 150 PSI and a shear adhesion of 275 PSI with 100% cohesive failure to oily galvanized steel.

EXAMPLE 9

A modified asphalt cement coating composition was prepared using the paint sludge putty of Example 2 by adding 1000 grams of asphalt cement (AC-20 available from Republic Asphalt) and 80 grams of paint sludge putty in a two gallon double planetary mixer. The mixture was then heated to approximately 225° F. by means of the steam in the mixer jacket and mixed for about 15 minutes until it was homogeneous.

The melt index and penetration of the samples were tested before and after heat aging for 24 hours at 300° F. The sample containing the paint sludge was found to have increased heat resistance properties. The percent change in melt index and penetration after heat aging of the asphalt with no paint sludge putty was 40% and 18.8% respectively, while the samples containing paint sludge putty showed a change of 26.9% and 13.8%. All other properties tested remained the same including cold flex and rolling ball tack.

EXAMPLE 10

A flexible PVC plastic was prepared using the paint sludge putty of Example 2 with the ingredients listed in Table 1 below.

A portion of polymeric plasticizer (up to 75%) was removed and replaced by paint sludge putty. For each percent of polymeric plasticizer to be replaced, one percent of the paint sludge putty was added. One percent of the filler was replaced with one percent of the monomeric plasticizer to obtain the desired viscosity.

500 gram batches of these compounds were prepared using a Kitchen-Aid mixer. The polymeric plasticizer and paint sludge putty were mixed together until homogeneous. The mixer was then added with the rest of the ingredients and mixed for 5 minutes.

TABLE 1

|  | % Replacement Compounds | | | |
| --- | --- | --- | --- | --- |
|  | (1) 0% | (2) 25% | (3) 50% | (4) 75% |
| Polymeric Plasticizer[1] | 82.5 | 62.0 | 41.3 | 20.5 |
| Paint sludge putty | 0 | 20.5 | 41.3 | 62.0 |
| Diisononylphthalate | 82.5 | 95.0 | 107.5 | 120.0 |
| calcium carbonate[2] | 165.0 | 152.5 | 140.0 | 127.5 |
| calcium oxide | 5.0 | 5.0 | 5.0 | 5.0 |
| Homopolymer PVC resin[3] | 165.0 | 165.0 | 165.0 | 165.0 |

[1]Plast-Hall 550 from C. P. Hal
[2]Camel-cal from H. M. Royal
[3]Vestolit 7030 from A. Schulman The tensile strength and % elongations of the different formulas were then tested, and the results are shown below in Table 2.

TABLE 2

|  | Compounds | | | |
| --- | --- | --- | --- | --- |
|  | (1) | (2) | (3) | (4) |
| Tensile Strength (PSI) | 780 | 786 | 790 | 796 |
| % Elongation | 228 | 226 | 225 | 224 |

EXAMPLE 11

A cured butyl rubber was prepared using the paint sludge putty of Example 2. 200 grams of Butyl 268 and 200 grams of Chlorbutyl 1068 (available from Exxon Chemical) were added to a mixer which was heated by the steam in the mixer jacket. These components were mixed together until the mixture was crumbly. 40 grams of N550, 220 grams N774 carbon black (available from Sid Richardson Carbon Company) and 68 grams of Sunpar 115 processing oil (available from R. E. Carroll) were then alternately added while mixing continuously until all the ingredients were fluxed together. 68 grams of paint sludge, 4 grams of stearic acid (available from R. E. Carroll), 20 grams of zinc oxide (available from Zinc Corporation of America), 2.0 grams of sulfur (available from Aldrich), 1 gram of TMTD (available from Elastochem) and 8 grams MBTS (available from Uniroyal) and all the ingredients were mixed for 30 minutes.

Sample batches were also prepared without paint sludge putty. Samples prepared with and without paint sludge putty were then cured for 40 minutes at 350° F. The sample containing the paint sludge putty showed a tensile strength of 500 psi and elongation of 78% while the sample which did not contain paint sludge putty showed a tensile strength of 280 psi and elongation of 650%.

EXAMPLE 12

A paint sludge putty was prepared in accordance with the present invention by adding 1,000 grams of raw paint sludge containing solvent (50% solids content) in a two-gallon double planetary mixer with a steam jacket. A decatalyzing agent, potassium hydroxide (potash), was then added to the sludge in an amount of 1% of the solids content of the raw sludge in order to provide a decatalyzing effect. The steam valve was then opened and the sludge was agitated for 55 minutes under vacuum pressure at about 20 psi and at a temperature of about 230° F.

Table 3 illustrates the physical properties of putty samples obtained from this process.

TABLE 3

|  | Sample 1 | Sample 2 | Sample 3 | Sample 4 |
| --- | --- | --- | --- | --- |
| Color | Gray | Gray | Gray | Gray |
| % Solids | 97.4% | 97.8% | 98.0% | 97.6% |
| Melt Index |  |  |  |  |
| Initial | 6.0 | 4.3 | 5.0 | 2.7 |
| Aged | 6.9 | 5.1 | 7.8 | 0 |
| Penetrometer |  |  |  |  |
| Initial | 135 | 160 | 187 | 97 |
| Aged | 163 | 182 | 227 | 38 |
| PVC Properties |  |  |  |  |
| Tensile (PSI) | 282 | 278 | 251 | 245 |
| Elongation | 110% | 100% | 100% | 80% |

EXAMPLE 3

In this example the use of the optional step of addition of processing fillers is illustrated comparatively. That is as shown in Table 4, runs A and C utilized paint sludges treated as described above in example 12 but without processing filler addition. The paint sludge in Run A is a organic solvent based sludge containing other curing paints. In Run B, then, the same paint sludge as used in Run A was treated by adding 18.5% Bardon clay (available from J. M. Huber Corp.) and 18.5% N550 carbon black (available from Sid Richardson Carbon Co.). The processing fillers were added after the decatalyzing step and prior to step of removing the solvent. Runs D, E and F use the same paint sludge as used in Run C, but with addition of 11.4% clay, 8.3% clay and the combination of 20% clay and 20% carbon black, respectively, after the decatalyzing step but prior to the step of removing the solvent. The results are as shown.

Also as shown a compounded polymeric composition was prepared with each of the treated paint sludges similar to the one shown in Example 10. The characteristics of each compounded polymeric composition is as shown.

A similar study is shown in Table 5, where run G represents a paint sludge putty prepared as in example 12 from an organic solvent based paint sludge; whereas, in runs H–P various amounts of clay and carbon black were added as shown. The characteristics both of the treated paint sludge and a sealant composition prepared with the treated paint sludge are shown.

TABLE 4

| Run | A | B 20% Clay 20% N550 | C | D 10% Clay | E 10% Clay | F 20% Clay 20% N550 |
|---|---|---|---|---|---|---|
| % Clay (est) | 0 | 18.5 | 0 | 11.4 | 8.3 | 20.0 |
| % N550 (est) | 0 | 18.5 | 0 | 0 | 0 | 20.0 |
| Color | Blue | Black | Purple | Blue | Blue | Black |
| Specific Gravity | 1.11 | 1.38 | 1.22 | 1.42 | 1.36 | 1.6 |
| Particle Size | −50 | −50 | −50 | −50 | −325 | −50 |
| % Solids | 98.5 | 97.8 | 99.2 | 97.5 | 97.0 | 99.1 |
| Oil Absorption | NM* | 43 | NM* | 30 | 35 | 52 |
| % Ash | 12.1 | 27.8 | 14.6 | 20.6 | 19.8 | 29.9 |
| Compounded Polymeric Composition Tensile Strength (PSI) | 284 | 294 | 263 | 267 | 319 | 401 |
| % Elongation | 215 | 165 | 135 | 220 | 220 | 180 |
| Viscosity (secs) Cup Cup A 40 PSI, 76° F. | 2 | 7 | 3 | 3 | 10 | 10 |
| Slump ½ × ½ × 4 in | >128/64 | 88/64 | >128/64 | >128/64 | 128/64 | 32/64 |

*NM - Not Measurable

TABLE 5

| Run | G | H | I | J | K | L | M | N | O | P |
|---|---|---|---|---|---|---|---|---|---|---|
| % Clay | 0 | 16.5 | 24.6 | 20.3 | 20.6 | 17.6 | 21.0 | 23 | 20.0 | 19.5 |
| % N550 | 0 | 16.5 | 24.6 | 20.3 | 20.6 | 17.6 | 21.0 | 23 | 20.0 | 19.5 |
| Color | Blue | Blue-Black | Gray | Blue-Black | Black | Black | Black | Black | Black | Black |
| Specific Gravity | 1.18 | 1.53 | 1.56 | 1.53 | 1.57 | 1.53 | 1.56 | 1.52 | 1.59 | 1.57 |
| Particle Size | −50 | −50 | −50 | −50 | −50 | −50 | −50 | −50 | −50 | −50 |
| % Solids | −98.1 | 97.4 | 97.6 | 96.8 | 96.8 | 97.5 | 98.3 | 98.4 | 97.7 | 97.6 |
| Oil Absorption | NM* | 21 | 20 | 22 | 20 | 20 | 21 | 21 | 24 | 24 |
| % Ash | 18.5 | 26.3 | 36.8 | 34.1 | 30.7 | 33.3 | 28.3 | 34.6 | 29.4 | 29.7 |
| Compounded Polymeric Composition: Tensile Strength (PSI) | 208 | 388 | 283 | 312 | 370 | 390 | 398 | 380 | 383 | 421 |
| % Elongation | 190 | 245 | 145 | 185 | 220 | 230 | 220 | 237 | 235 | 235 |
| Viscosity (secs) Cup A 40 PSI, 76° F. | 3 | 3 | 6 | 3 | 4 | 5 | 6 | 4 | 3 | 3 |
| Slump ½ × ½ × 4 (32/64) | >128/64 | >128/64 | 128/64 | >128/64 | >128/64 | 80/64 | 56/64 | 128/64 | >128/64 | >128/64 |

*NM - Not Measurable

EXAMPLE 14

A waterbased coating was prepared in accordance with the present invention by adding 1470 grams of paint sludge putty of Example 2 and 110 grams of carbon black (N550 available from Sid Richardson Carbon Co.) in a two gallon double planetary mixer and heated to approximately 200° F. by means of the steam in the mixer jacket. The mixture was agitated at high speed for about 10 minutes and allowed to cool to approximately 160° F.

In a separate container 144 grams of Tergitol XD available from Union Carbide, 48 grams of each T-DET N20 available from Harcos Chemical and Aromatic 100 available from Chem Central were mixed together using a sunbeam mixer and then added to the first mixture. The two mixtures were mixed again for 10 minutes, then 2410 grams of Airflex 526 BP Emulsion available from Air Products was added slowly to the mixture with 5 minutes of mixing in between additions. 800 grams of water was then added and mixed for 10 minutes.

The resulting sealer was deaired under a vacuum of 25 in Hg, which yielded on air free product with an excellent sealing property that is flexible and tack-free.

It will be obvious to those skilled in the art that various changes may be made without departing from the scope of the invention which is not to be considered limited to what is described in the specification.

What is claimed is:

1. A method for treating raw paint sludge containing uncured polymer resin, water and/or organic solvent comprising the steps of:

removing a substantial portion of said water and/or organic solvent by drying said paint sludge without curing said polymer resin; and decatalyzing said paint sludge by treatment with a decatalyzing agent comprising a base having at pH in the range of from 8–13.

2. The method of claim 1 wherein said raw paint sludge is an organic solvent based paint sludge, a water based paint sludge, a combination water and organic solvent based paint sludge, a reactive curing paint sludge, a powdered coating paint sludge, or combinations thereof.

3. The method of claim 2 wherein said sludge comprises purged solvent sludge.

4. The method of claim 2 wherein said sludge comprises still bottoms sludge.

5. The method of claim 1 wherein the step of drying said paint sludge comprises agitating said sludge under a vacuum at a temperature of about 225° F.

6. The method of claim 1 wherein said base comprises from about 0.1 to 10% by weight of the raw paint sludge.

7. The method of claim 1 wherein said base is selected from the group consisting of diethanolamine, 2-amino-2-methyl-2-propanol, diisopropanol amine, triisopropanol amine, potassium hydroxide, and sodium hydroxide.

8. The method of claim 1 wherein said decatalyzing step takes place prior to said removing step.

9. The method of claim 8 wherein after the decatalyzing step and prior to the removing step, processing fillers are added at the rate of 5 to 75 weight percent of the raw paint sludge.

10. The method of claim 9 wherein said processing fillers are selected from the group consisting of carbon black, clay, calcium oxide, calcium sulfate, calcium chloride, magnesium sulfate, sodium sulfate, potassium carbonate, calcium carbonate, silica, talc, hydrated aluminum, wood flour, shells, poly soy, cork and mixtures thereof.

11. The method of claim 10 wherein said processing fillers are selected from the group consisting of carbon black, clay and mixtures thereof.

12. The method of claim 1 wherein said removing step is performed without curing said polymer in said paint sludge, and said decatalyzing step is performed thereafter.

13. A method for treating raw paint sludge containing water and/or organic solvent and uncured polymer to form a paint sludge putty comprising the steps of:

adding a decatalyzing agent comprising potassium hydroxide to said sludge; and heating said sludge at a temperature of about 225° F.

14. The method of claim 13 further including the step of adding 5 to 75% of a processing filler selected from the group consisting of carbon black, clay and mixtures thereof, prior to heating, and wherein a paint sludge powder is formed.

* * * * *